Figure 1:
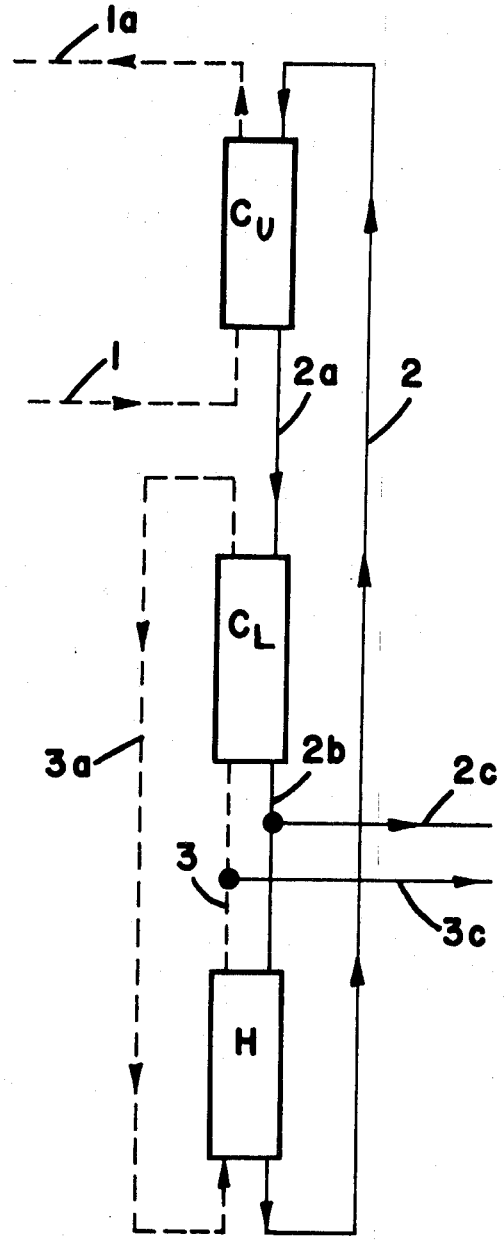

United States Patent
Rae

[11] 3,716,622
[45] Feb. 13, 1973

[54] EXTRACTION OF DEUTERIUM FROM AMMONIA SYNTHESIS GAS

[75] Inventor: Howard K. Rae, Deep River, Ontario, Canada

[73] Assignee: Atomic Energy of Canada Limited, Ottawa, Ontario, Canada

[22] Filed: April 3, 1970

[21] Appl. No.: 25,316

[30] Foreign Application Priority Data

April 8, 1969 Canada..................................047999

[52] U.S. Cl. ..................23/210, 23/204, 23/211, 23/220
[51] Int. Cl. ..................C01b 4/00, C01b 4/06
[58] Field of Search ..............23/210 I, 210, 211, 220

[56] References Cited

UNITED STATES PATENTS

| | | | |
|---|---|---|---|
| 3,437,442 | 4/1969 | Poole | 23/210 I X |
| 3,505,016 | 4/1970 | Walker et al. | 23/210 |
| 3,036,891 | 5/1962 | Becker | 23/210 I X |
| 3,377,135 | 4/1968 | Kenyon | 23/210 X |
| 3,464,789 | 9/1969 | Courvoisier et al. | 23/210 X |
| 3,457,041 | 7/1969 | Klein et al. | 23/210 X |
| 2,927,003 | 3/1960 | Becker | 23/211 |
| 2,787,526 | 4/1957 | Sperack | 23/210 X |

Primary Examiner—Edward Stern
Attorney—Stevens, Davis, Miller & Mosher

[57] ABSTRACT

In the extraction of deuterium from a mixture of nitrogen and hydrogen commercially prepared for subsequent synthesis to ammonia, the synthesis gas is passed through a first cold region in deuterium exchanging relationship with an exchange liquid, said exchange liquid being selected from the group consisting of ammonia, an amine, a mixture of amines, and a mixture of ammonia and an amine and a mixture of amines, and a stream of hydrogen gas is circulated through a second cold region and a hot region in deuterium exchanging relationship with the exchange liquid. Thus the synthesis gas is not passed through the second cold region or the hot region, and these regions do not therefore have to be capable of accommodating so large a flow as the first cold region.

6 Claims, 2 Drawing Figures

INVENTOR
HOWARD K. RAE

EXTRACTION OF DEUTERIUM FROM AMMONIA SYNTHESIS GAS

This invention relates to the extraction of deuterium from a gas stream containing hydrogen, deuterium, and nitrogen.

There is frequently a significant amount of deuterium in the gaseous mixture of nitrogen and hydrogen commercially prepared for subsequent synthesis to ammonia, and various methods have been proposed for extracting some of the deuterium from the synthesis gas before it passes through the synthesis plant. Deuterium is usually present in the molecular form HD (hydrogen deuteride). Some of these proposed methods employ a bithermal process in which the synthesis gas is passed through hot and cold regions in countercurrent flow to liquid ammonia. In these known methods, the mixture of nitrogen and hydrogen is passed through the hot and cold regions. As far as deuterium extraction is concerned, the nitrogen is superfluous and the volume occupied thereby results in the deuterium extraction plant having to be undesirably large.

According to this invention, the synthesis gas is passed through a first cold region in deuterium exchanging relationship with an exchange liquid, said exchange liquid being selected from the group consisting of ammonia, an amine, a mixture of ammonia and an amine and a mixture of amines, and a stream of hydrogen gas is circulated through a second cold region and a hot region in deuterium exchanging relationship with the exchange liquid. Thus the synthesis gas is not passed through the second cold region or the hot region, and these regions do not therefore have to be capable of accommodating so large a flow as the first cold region.

To improve the deuterium recovering from the synthesis gas, the first cold region mentioned in the preceeding paragraph may be split into two cold regions, with the synthesis gas passing through one of these split regions and the stream of hydrogen gas passing through the other of these regions, and the stream of exchange liquid having been split so that a portion thereof passes through a respective one of these regions and then combines to form a single stream of exchange liquid thereafter. In this case, the exchange liquid may be other than those mentioned above, and may for example be water.

Some nitrogen from the stream of synthesis gas may be transferred to the stream of exchange liquid, and to reduce the amount of nitrogen in the liquid, means for stripping nitrogen therefrom may be provided. This stripping means may include a small purge flow of hydrogen from the hydrogen stream, this purge flow being passed in nitrogen-exchanging relationship with the exchange liquid after it leaves the cold region in which it was in contact with the synthesis gas.

Figure 2:
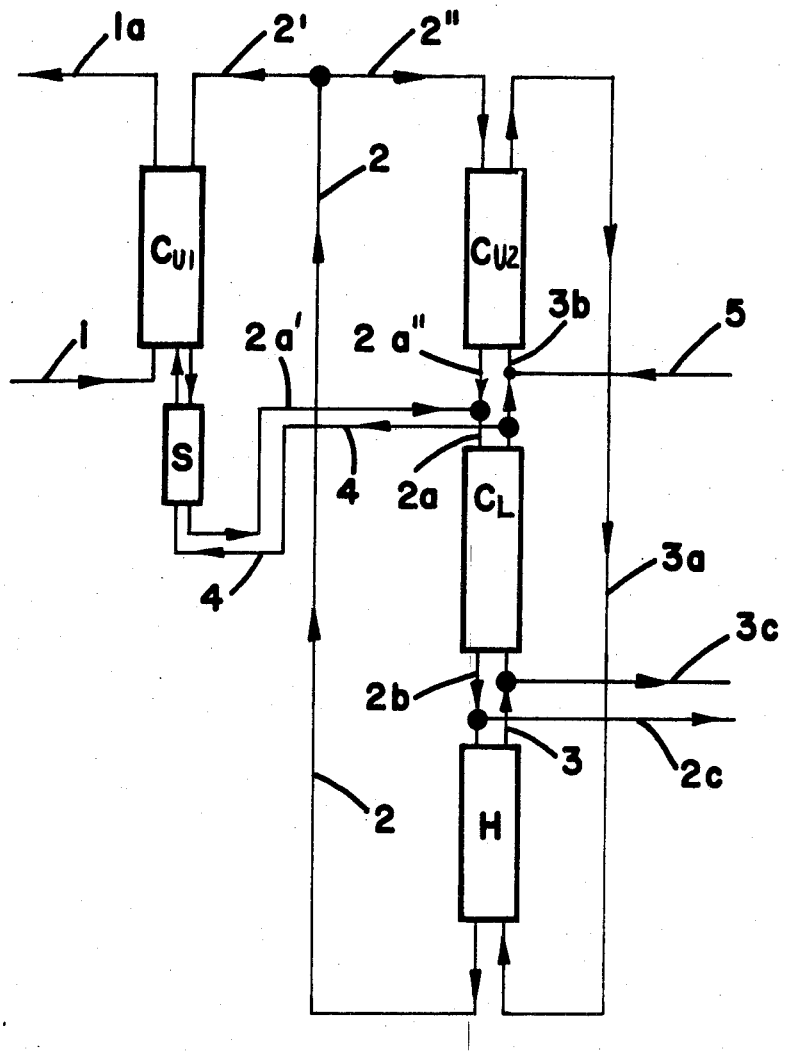

Embodiments of the invention will now be described, by way of example, with reference to the accompanying drawings, of which, FIG. 1 is a flow diagram of a process according to one embodiment, and, FIG. 2 is a flow diagram of a process according to a second embodiment.

Referring first to FIG. 1, a stream 1 of gas prepared for subsequent synthesis to ammonia passes up through an upper cold tower $C_U$ in countercurrent flow to a stream 2 of exchange liquid consisting of ammonia containing potassium amide as catalyst. The synthesis gas stream 1 contains mainly hydrogen and nitrogen in the approximate ratio of three to one by volume, and also contains a small but significant amount of deuterium. During its passage through the cold tower $C_U$, the synthesis gas stream 1 loses some of its deuterium to the ammonia stream 2. The depleted synthesis gas stream 1a leaves the top of the cold tower $C_U$ and is taken to the ammonia synthesis plant.

After leaving the bottom of the cold tower $C_U$, the enriched ammonia stream 2a passes downwardly through a lower cold tower $C_L$ in countercurrent flow to an upwardly travelling stream 3 of hydrogen gas, which contains some deuterium. The hydrogen stream 3 loses some of its deuterium to the ammonia stream 2a, which thus becomes further enriched. After leaving the top of cold tower $C_L$, the depleted hydrogen stream 3a passes upwardly through a hot tower H in countercurrent flow to the ammonia stream 2b which has just left the bottom of the cold tower $C_L$. The ammonia stream 2b loses some of its deuterium to the hydrogen stream 3a.

The enriched hydrogen stream 3 leaving the top of the hot tower H is then passed to the bottom of cold tower $C_L$. Thus the hydrogen stream 3, 3a circulates up through the hot tower H, then up through the cold tower $C_L$, and back to the hot tower H. After leaving the bottom of the hot tower H, the depleted ammonia stream 2 is passed to the top of the cold tower $C_U$. Thus the ammonia stream 2, 2a, 2b circulates down through the upper cold tower $C_U$, down through the lower cold tower $C_L$, down through the hot tower H and back to the upper cold tower $C_U$.

Both the hydrogen stream 3, 3a and the ammonia stream 2, 2a, 2b are in their most deuterium-enriched condition between the lower cold tower $C_L$ and the hot tower H, and thus portions 3c, 2c of one or both these streams can be withdrawn at this point for passage through further enrichment stages or for deuterium extraction treatment. Ammonia and/or hydrogen must of course be supplied to the respective streams to replace the portions withdrawn. Where further enrichment steps are provided, the replacement ammonia and/or hydrogen may be depleted fluid from a further stage. Makeup flows of ammonia and hydrogen into the respective streams will also be necessary to compensate for losses in the system.

Thus, the synthesis gas which contains a relatively large volume of nitrogen, which is of no use in the deuterium-extraction process, is only passed through the upper cold tower $C_U$. Only this upper tower $C_U$ has therefore to accommodate the large flow of synthesis gas, while the lower cold tower $C_L$ and the hot tower H have only to accommodate the smaller circulatory flows of hydrogen and ammonia.

In one specific example of this process, the two cold towers $C_U$ and $C_L$ were at a temperature of $-40°$ C and the hot tower H was at $70°$ C. The synthesis gas entering the upper cold tower $C_U$ contained 120 ppm (parts per million as atom ratio) of deuterium compared to hydrogen in atom ratio, and this was reduced to 76 ppm in the cold tower $C_U$ giving a recovery of 37 percent. The deuterium concentration of the ammonia stream was 380 ppm when leaving the hot tower H, 640 ppm when leaving the upper cold tower $C_U$ and 4,500 ppm when leaving the lower cold tower $C_L$. The deuterium concentration of the hydrogen stream was 120 ppm when leaving the lower cold tower $C_L$ and 1,300 ppm when leaving the hot tower H.

Instead of using an ammonia stream as the exchange liquid, a suitable amine or a mixture thereof with ammonia or other amine may be used. The amine is preferably an amine having up to five carbon atoms per molecule, and is preferably a primary aliphatic amine.

FIG. 2 shows a flow diagram which represents an improved process compared to FIG. 1 in that an improved deuterium recovery can be obtained. As the flow diagram shown in FIG. 2 has some features in common with that of FIg. 1, the same reference numbers will be used to indicate the same features.

In the process of FIG 2, the upper cold tower is divided into two parts $C_U1$, and $C_U2$. The synthesis gas stream 1 passes only through the upper cold tower $C_U1$ in the upwards direction, and the hydrogen gas stream 3b passes upwardly through the upper cold tower $C_U2$ after it leaves the upper end of the lower cold tower $C_L$. After leaving the lower end of the hot tower H, the ammonia stream 2, with potassium amide as catalyst, is divided into two streams 2' and 2''. The stream 2' is passed downwardly through the upper cold tower $C_U1$, in countercurrent flow to the synthesis gas stream 1, and the stream 2'' passes downwardly through the upper cold tower $C_U2$ in countercurrent flow to the hydrogen stream 3. After leaving the upper cold towers $C_U1$ and $C_U2$, the ammonia stream 2a' and 2a'' respectively are combined to form the ammonia stream 2a passing downwardly through the lower cold tower $C_L$.

With this process, a greater deuterium recovering from the synthesis gas is possible, because deuterium is transferred from the hydrogen stream 3b to the ammonia stream 2'' in the upper cold tower $C_U2$, and this results in the deuterium content of the ammonia stream 2 leaving the bottom of the hot tower H, and stream 2' passing through the upper cold tower $C_U1$, being lower than that of the ammonia stream 2 entering the upper cold tower $C_U$ of the process described with reference to FIG. 1. Thus, the ammonia stream 2' is capable of extracting more deuterium from the synthesis gas stream 1 in the arrangement of FIG. 2 than the ammonia stream 2 in the arrangement of FIG. 1.

In an example of the process of FIG. 2, the three cold towers $C_U1$, $C_U2$, and $C_L$ were each at −40° C and the hot tower H was at 70° C. The deuterium content was compared to hydrogen in the synthesis gas stream entering the cold tower $C_U1$ was 120 ppm and this stream left the cold tower $C_U1$ with a deuterium concentration of 28 ppm, the recovery therefore being 77 percent, which is a significant improvement over the process described with reference to FIG. 1, where the recovery was 37 percent. The deuterium content of the ammonia stream 2 was 110 ppm as it left the hot tower H, the recombined streams 2a' and 2a'' had a concentration of 640 ppm when entering the lower cold tower $C_L$, and when leaving $C_L$ the deuterium concentration of the stream 2b was 4,500 ppm. The hydrogen stream had a deuterium concentration of 28 ppm as it left the upper cold tower $C_U2$, 1,300 ppm when leaving the hot tower H, and 120 ppm when leaving the lower cold tower $C_L$.

The exchange liquid stream 2 should preferably be divided into the two streams 2' and 2'' in the same ratio as that of the hydrogen flows through the cold towers $C_U1$ and $C_U2$ respectively.

In a similar manner as that described with reference to FIG. 1, the ammonia stream 2 may be replaced by a stream of a liquid amine, a mixture of ammonia and an amine, or a mixture of two amines, the specific example being given in the process of FIG. 1 being also applicable to the process of FIG. 2. In the process of FIG. 2, the exchange liquid may be water.

It may be found that, both in the process of FIG. 1 and in the process of FIG. 2, an undesirable amount of nitrogen may be carried along in the ammonia or amine stream as it leaves the cold tower $C_U$ or $C_U1$, in which deuterium was transferred from the synthesis gas to the ammonia stream. The quantity of nitrogen in the ammonia stream may be reduced to an acceptable amount by means of a nitrogen stripper S (shown only in FIG. 2) through which the ammonia stream 2a or 2a' passes downwardly when flowing from the cold tower $C_U$ or $C_U1$ to the lower cold tower $C_L$. A purging stream 4 of hydrogen is taken from the hydrogen stream 3 as it leaves the top of the lower cold tower $C_L$. The purging stream 4 passes upwardly through the stripper S in countercurrent flow to the ammonia stream 2a or 2a', and then passes upwardly through the upper cold tower $C_U1$, thereby joining the synthesis gas stream 1.

As the purging stream 4 of hydrogen contacts the ammonia stream 2a or 2a' in the stripper S, it takes with it some of the nitrogen in the stream 2a or 2a' thereby reducing the amount of nitrogen in the ammonia stream 2a or 2a' to an acceptable level. In this way, the nitrogen content of the exchange liquid stream can be maintained for example in the range 0.1 to 1 percent of the dissolved gas which is a small fraction of the normal 25 mole percent in the synthesis gas. To replace the hydrogen lost from the hydrogen stream, a make-up hydrogen supply 5 enters the hydrogen stream 3b between the lower cold tower $C_L$ and the upper cold tower $C_U2$.

It may be convenient in some plants to use a small stream of hydrogen from some source other than the top of the lower cold tower $C_L$ to strip nitrogen from the ammonia. Also, other stripping techniques such as flashing a small part of the ammonia after pressure reduction could be used.

A technique for reducing the amount of dissolved nitrogen carried in the liquid stream leaving the bottom of $C_U1$ is to operate that cold exchange tower at a temperature and pressure that favors a lower dissolved gas content, i.e., at lower temperature and pressure. It is feasible with the flow arrangement shown in FIG. 2 to operate $C_U1$ at temperature and pressure conditions much different from $C_U2$. By way of example, $C_U1$ may be in the pressure range 300 to 500 psi and at a temperature of −60° C, while $C_U2$ is at 2,000 to 3,000 psi and −40° C. The amount of mixed nitrogen and hydrogen dissolved in liquid ammonia at the former condition is about one-tenth of that at the latter. Thus the size of the stripper S and of the purge stream 4 can be reduced considerably and still maintain the low nitrogen content of the exchange liquid stream 2.

I claim:

1. A process for extracting deuterium from a gas stream containing hydrogen, deuterium as hydrogen deuteride and nitrogen including passing said gas stream and a first stream of exchange liquid selected from the group consisting of ammonia, an amine, a mixture of ammonia and an amine, and mixtures of amines and containing an exchange catalyst through a first cold region to cause deuterium in said gas stream to be transferred to the exchange liquid, stripping dissolved nitrogen from said first stream of exchange liquid as it leaves said first cold region, passing a second stream of said exchange liquid containing said exchange catalyst and a stream of hydrogen gas through a second cold region to cause deuterium to be transferred from the hydrogen gas to the exchange liquid, combining said first and second streams of said exchange liquid and passing said combined streams of exchange liquid through a third cold region through which said stream of hydrogen gas also flows to cause deuterium to be transferred from the hydrogen gas to said combined exchange liquid streams, passing said combined streams of exchange liquid and said stream of hydrogen gas through a hot region to cause deuterium to be transferred from said combined exchange liquid streams to the hydrogen gas, the stream of hydrogen gas flowing in turn through the hot region, the third cold region, the second cold region and then returning to the hot region, dividing said combined streams of exchange liquid after leaving the hot region into said first and second streams flowing to the first and second cold regions respectively, and withdrawing a portion of fluid from at least one of the streams between the third cold region and the hot region where they are enriched with deuterium.

2. A process according to claim 1 including removing dissolved nitrogen from said exchange liquid as it leaves said first cold region by passing a purging flow of hydrogen through said exchange liquid.

3. A process according to claim 1 wherein the exchange liquid contains an amine having up to five carbon atoms per molecule.

4. A process according to claim 1 wherein the exchange liquid contains a primary aliphatic amine.

5. A process according to claim 1 wherein the exchange liquid contains a primary aliphatic amine having up to five carbon atoms per molecule.

6. A process according to claim 1 wherein the exchange liquid contains ammonia.

* * * * *